United States Patent
Li et al.

(10) Patent No.: US 8,014,775 B2
(45) Date of Patent: Sep. 6, 2011

(54) METHOD AND SYSTEM FOR IMPLEMENTING MESSAGING SERVICES AND A MESSAGE APPLICATION SERVER

(75) Inventors: Wei Li, Shenzhen (CN); Lei Diao, Shenzhen (CN); Yahui Zhang, Shenzhen (CN); Lei Shi, Shenzhen (CN); Dijin Xie, Shenzhen (CN); Weili Huang, Shenzhen (CN); Xianqiang Luo, Shenzhen (CN); Dongmo Xie, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 399 days.

(21) Appl. No.: 12/342,998

(22) Filed: Dec. 23, 2008

(65) Prior Publication Data

US 2009/0111430 A1 Apr. 30, 2009

Related U.S. Application Data

(63) Continuation of application No. PCT/CN2008/070947, filed on May 13, 2008.

(30) Foreign Application Priority Data

May 17, 2007 (CN) .......................... 2007 1 0107045

(51) Int. Cl.
*H04W 4/00* (2009.01)
(52) U.S. Cl. ..................... 455/435.1; 455/455; 370/352; 370/401
(58) Field of Classification Search ............... 455/412.1, 455/412.2, 414.1, 432.3, 433, 435.1, 445; 370/356, 352, 353, 354, 355, 401, 395.52; 709/222, 229, 227
See application file for complete search history.

(56) References Cited

U.S. PATENT DOCUMENTS 7,027,433 B2 * 4/2006 Tuohino et al. ............... 370/352
(Continued)

FOREIGN PATENT DOCUMENTS

CN 1758649 A 4/2006
(Continued)

OTHER PUBLICATIONS

Written Opinion of the International Searching Authority issued in corresponding PCT Application No. PCT/CN2008/070947; mailed Aug. 28, 2008.

(Continued)

*Primary Examiner* — Jean Gelin
(74) *Attorney, Agent, or Firm* — Brinks Hofer Gilson & Lione (57) ABSTRACT

A method for implementing messaging services includes receiving a message body sent by a calling user, determining whether the calling user and a called user are in the same IP Multimedia Subsystem (IMS) domain according to user registration information, and sending the message body to the called user if the calling user and the called user are in the same IMS domain. An IMS messaging service system includes a Message Application Server (MAS), a Call Session Control Function (CSCF) entity, a calling User Equipment (UE) and a called UE. A MAS includes a user registration information storing unit, a receiving unit, and a determining unit adapted to determine whether the calling user and the called user are in the same IMS domain according to the user registration information stored in the user registration information storing unit when the receiving unit receives the message body from the calling user, and a sending unit. According to embodiments of the present disclosure, when the calling user and the called user are in the same IMS domain, the information interaction process and the message body transmission time may be shortened.

8 Claims, 6 Drawing Sheets

U.S. PATENT DOCUMENTS

| | | | |
|---|---|---|---|
| 7,876,743 B2 * | 1/2011 | Garcia-Martin et al. | 370/352 |
| 2004/0148416 A1 | 7/2004 | Aarnos et al. | |
| 2006/0242310 A1 * | 10/2006 | Quah et al. | 709/229 |
| 2006/0245391 A1 | 11/2006 | Vaidya et al. | |
| 2007/0149166 A1 * | 6/2007 | Turcotte et al. | 455/404.1 |
| 2007/0195755 A1 | 8/2007 | Li et al. | |
| 2008/0137646 A1 * | 6/2008 | Agarwal et al. | 370/352 |
| 2008/0160995 A1 * | 7/2008 | Thiebaut et al. | 455/433 |
| 2008/0200170 A1 * | 8/2008 | Sun et al. | 455/435.1 |
| 2008/0298353 A1 * | 12/2008 | Zhu et al. | 370/356 |
| 2010/0070632 A1 * | 3/2010 | Song et al. | 709/227 |
| 2010/0136990 A1 * | 6/2010 | Stura et al. | 455/450 |

FOREIGN PATENT DOCUMENTS

| | | |
|---|---|---|
| CN | 1855829 A | 11/2006 |
| CN | 1925450 A | 3/2007 |
| CN | 101060650 A | 10/2007 |
| EP | 1 760 986 A1 | 3/2007 |
| WO | 03/085911 A1 | 10/2003 |
| WO | 2004/071104 A2 | 8/2004 |
| WO | 2008/141562 A1 | 11/2008 |

OTHER PUBLICATIONS

Office Action issued in corresponding Chinese Patent Application No. 2007101070459; issued Aug. 29, 2008.

Supplementary European Patent Application issued in corresponding European Patent Application No. 08 74 8556.1; issued Jun. 28, 2010.

International Search Report issued in corresponding PCT Application PCT/CN2008/070947; mailed Aug. 28, 2008.

* cited by examiner

METHOD AND SYSTEM FOR IMPLEMENTING MESSAGING SERVICES AND A MESSAGE APPLICATION SERVER

CROSS REFERENCES TO RELATED APPLICATIONS

This application is a continuation application of PCT/CN2008/070947, filed May, 13, 2008 which claims priority to the Chinese Patent Application No. 200710107045.9, filed with the Chinese Patent Office on May 17, 2007 and entitled "Method for Implementing Messaging Services and A Message Application Server", the contents of which are incorporated herein by reference in their entirety.

FIELD OF THE DISCLOSURE

The present disclosure relates to multimedia communication technologies and IP Multimedia Subsystem (IMS) technologies, and in particular, to a method and system for implementing IMS messaging services and a message application server.

BACKGROUND OF THE DISCLOSURE

The messaging service is a prevalent digital service in the current mobile communication market that enables a message to be sent from one entity to another. The transfer modes of messages include Instant Messaging (IM), Short Message Service (SMS), Multimedia Message Service (MMS), email, and so on. With the development of communication technologies, especially with the emergence of the IP Multimedia Subsystem (IMS) domain, the contents available from the messaging service are more and more diversified. For example, the message body may include texts, pictures, audios, videos, games, and so on. The IMS messaging service comes in two modes, instant messaging and store-and-forward messaging, both of which are subdivided into session-based messaging and non session-based messaging from the perspective of the different bearing mode. For a session-based message, a connection is created through a session and the message body is transmitted through the created connection. For a non session-based message, the message body is carried in a request message directly, for example, a "MESSAGE" message.

Figure 1:
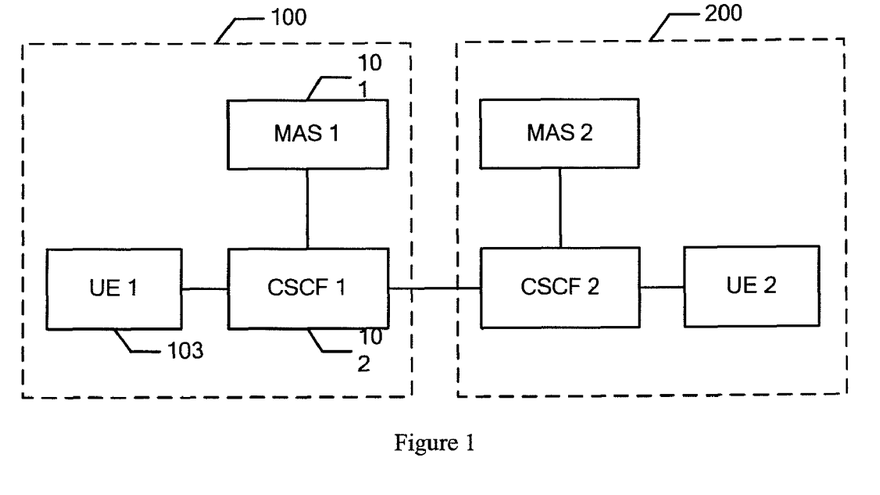
FIG. 1 shows a network reference model of IMS messaging services.

FIG. 1 shows a network reference model of the IMS messaging service where the main network entities include a Message Application Server (MAS) 101, a Call Session Control Function (CSCF) 102, and a User Equipment (UE) 103. The MAS 101 is responsible for processing IMS messaging services. The CSCF 102 is adapted to provide session control services and provide the UE with session control and registration services. The UE 103 may be a Personal Computer (PC), a mobile phone, or a telephone etc.

For ease of description, the calling user equipment is represented by UE 1. The network where UE 1 is located is an originating network 100, and any equipment marked with "1" in the originating network is originating equipment. The called user equipment is represented by UE 2. The network where the called user is located is a terminating network 200, and any equipment marked with "2" in the terminating network is terminating equipment. In FIG. 1, the network marked with "100" is an originating network, and the network marked with "200" is a terminating network.

Figure 2:
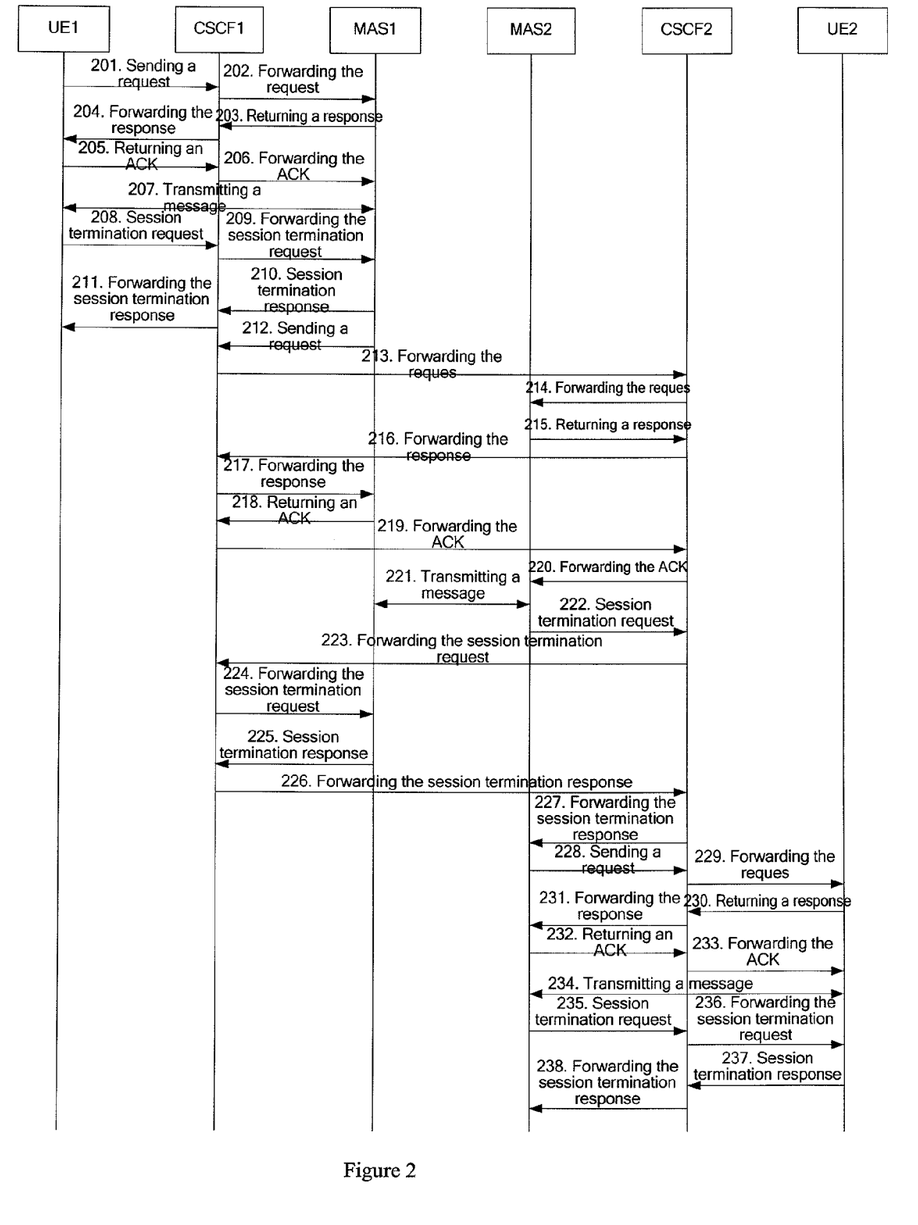
FIG. 2 is a flowchart of session-based messaging in the store-and-forward messaging service in the conventional technology.

As shown in FIG. 2, a session-based messaging process in an IMS store-and-forward messaging service in the conventional technology includes the following steps:

Steps 201 to 202: UE 1 sends an INVITE request to MAS 1 through CSCF 1.

The INVITE request includes session description based on a Session Description Protocol (SDP), and the session description includes media information parameters for facilitating MAS 1 to join the session.

Steps 203 to 204: MAS 1 returns a 200 OK response to UE 1 through CSCF 1.

If MAS 1 agrees to join the session, MAS 1 returns a 200 OK response, and a series of media parameters supported by MAS 1 are listed in the session description based on the SDP of the 200 OK response.

Steps 205 to 206: UE 1 returns an ACK message to MAS 1 through CSCF 1 thereby acknowledging reception of the 200 OK response which is sent by MAS 1 in response to the INVITE request.

Step 207: Through a connection based on a Transmission Control Protocol (TCP) created in steps 201 to 206, UE 1 transfers the message body to MAS 1.

Steps 208 to 209: UE 1 sends a session termination request which is forwarded to MAS 1 through CSCF 1.

Steps 210 to 211: MAS 1 returns a session termination response to UE 1 through CSCF 1.

Steps 212 to 214: MAS 1 forwards the INVITE request to MAS 2 through CSCF 1 and CSCF 2.

Steps 215 to 217: MAS 2 returns a 200 OK response to MAS 1 through CSCF 2 and CSCF 1.

Steps 218 to 220: MAS 1 returns an ACK message to MAS 2 through CSCF 1 and CSCF 2.

Step 221: Through the TCP connection created in steps 212 to 220, MAS 1 transfers the message body to MAS 2.

Steps 222 to 224: MAS 2 sends a session termination request which is forwarded to MAS 1 through CSCF 2 and CSCF 1.

Steps 225 to 227: MAS 1 returns a session termination response which is forwarded to MAS 2 through CSCF 1 and CSCF 2.

Steps 228 to 229: MAS 2 sends an INVITE request to UE 2 through CSCF 2.

Steps 230 to 231: UE 2 returns a 200 OK response to MAS 2 through CSCF 2.

Steps 232 to 233: MAS 2 returns an ACK message to UE 2 through CSCF 2.

Step 234: Through the TCP connection created in steps 228-233, MAS 2 transfers the message body to UE 2.

Steps 235 to 236: MAS 2 sends a session termination request to UE 2 through CSCF 2.

Steps 237 to 238: UE 2 returns a session termination response to MAS 2 through CSCF 2.

Through the foregoing steps, UE 1 sends the message body to UE 2 in a session-based mode.

The above is a detailed process of transmitting a message in the session-based mode in the messaging service of the store-and-forward mode. In the foregoing steps, steps 201 to 211 are a basic process where the calling user negotiates with the originating MAS to create a connection and transfers the message body through the created connection to the originating MAS. Steps 212 to 227 are a basic process where the originating MAS creates a connection with the terminating MAS and sends the message body from the originating MAS to the terminating MAS. Steps 228 to 238 are a basic process where the terminating MAS creates a connection with the called user and transfers the message body to the called user. Therefore, the message body sent by the calling user arrives at the called user only after being forwarded by the originating MAS and the terminating MAS. Complex interaction is required during the transmission and it takes a long time to transmit the message body to the called user.

Instant messaging differs from store-and-forward messaging in that: the instant messaging service is available only when the calling user and the called user are both online and each instant message is an independent transaction. However, during the implementation of an instant messaging service, the instant message arrives at the called user only after being forwarded by an originating message server and a terminating message server. Complex interaction is also required during the transmission and it takes a long time to transmit the message body to the called user.

In the research process of the present disclosure, the inventor finds that in the technical solution to instant messaging services and store-and-forward messaging services, a message body sent by the calling user arrives at the called user through multiple interactions only after being forwarded through an originating MAS and a terminating MAS in any scenario. The process is rather complicated and it takes a long time to transmit the message body.

SUMMARY OF THE DISCLOSURE

Embodiments of the present disclosure provide a method for implementing messaging services and a Message Application Server (MAS) to simplify the information interaction process in the IMS domain and shorten the transmission time of the message body.

A method for implementing IMS messaging services provided in an embodiment of the present disclosure includes receiving a message body sent by a calling user, determining whether the calling user and a called user are in the same IMS domain according to user registration information and sending the message body to the called user directly if the calling user and the called user are in the same IMS domain.

An IMS messaging service system provided in an embodiment of the present disclosure includes a Message Application Server (MAS), a Call Session Control Function (CSCF) entity, a calling User Equipment (UE), and a called UE. The MAS is adapted to determine whether the calling user and the called user are in the same IMS domain according to the registration information of the calling user and the called user and send a message to the UE. The CSCF entity is adapted to forward the message between the MAS and the UE, and the message body is sent to the called user directly through the CSCF if the MAS determines that the calling user and the called user are in the same IMS domain.

Another method for implementing IMS messaging services in an embodiment of the present disclosure includes: receiving a session connection creation request sent by a calling user; determining whether the calling user and a called user belong to the same IMS domain according to user registration information; forwarding the session connection creation request to the called user if the calling user and the called user are in the same IMS domain; and receiving a message body sent by the calling user through the connection created by means of the session connection creation request, and forwarding the message body to the called user.

A Message Application Server (MAS) provided in an embodiment of the present disclosure includes: a user registration information storing unit, adapted to store user registration information; a receiving unit, adapted to receive a message body sent by a calling user; a first determining unit, adapted to determine whether the calling user and a called user are in the same IMS domain, and when the receiving unit receives the message body sent by the calling user, determine whether the calling user and the called user are in the same IMS domain according to the user registration information stored in the user registration information storing unit; and a first sending unit, adapted to send the message body received by the receiving unit from the calling user to the called user directly when the first determining unit determines that the calling user and the called user are in the same IMS domain.

Another MAS provided in an embodiment of the present disclosure includes a user registration information storing unit adapted to store user registration information, a first receiving unit adapted to receive a session connection creation request sent by a calling user, a second receiving unit adapted to receive a message body sent by the calling user, a determining unit adapted to determine whether the calling user and a called user are in the same IMS domain according to the user registration information stored in the user registration information storing unit when the first receiving unit receives the session connection creation request from the calling user, and a sending unit, when the determining unit determines that the calling user and the called user are in the same IMS domain, adapted to forward the session connection creation request to the called user, receive the message body from the calling user through the connection created by means of the session connection creation request, and forward the message body to the called user.

As seen from the foregoing technical solution, after it is determined that the calling user and the called user are in the same IMS domain, the message body is sent to the called user directly through information interaction with the called user rather than being sent to the terminating MAS and then forwarded, thus shortening the interaction process and the message body transmission time.

DETAILED DESCRIPTION OF THE DISCLOSURE

For better understanding of the technical solution, objectives and merits of the present disclosure, the present disclosure is hereinafter described in detail with reference to accompanying drawings and preferred embodiments.

For ease of description in the following text, the calling user equipment is represented by UE 1, the network where UE 1 is located is an originating network, and any equipment marked with "1" in the originating network is originating equipment. The called user equipment is represented by UE 2, the network where the called user equipment is located is a terminating network, and any equipment marked with "2" in the terminating network is terminating equipment. In the network reference model of IMS messaging services in FIG. 1, the network marked with "100" is an originating network, and the network marked with "200" is a terminating network.

Figure 3:
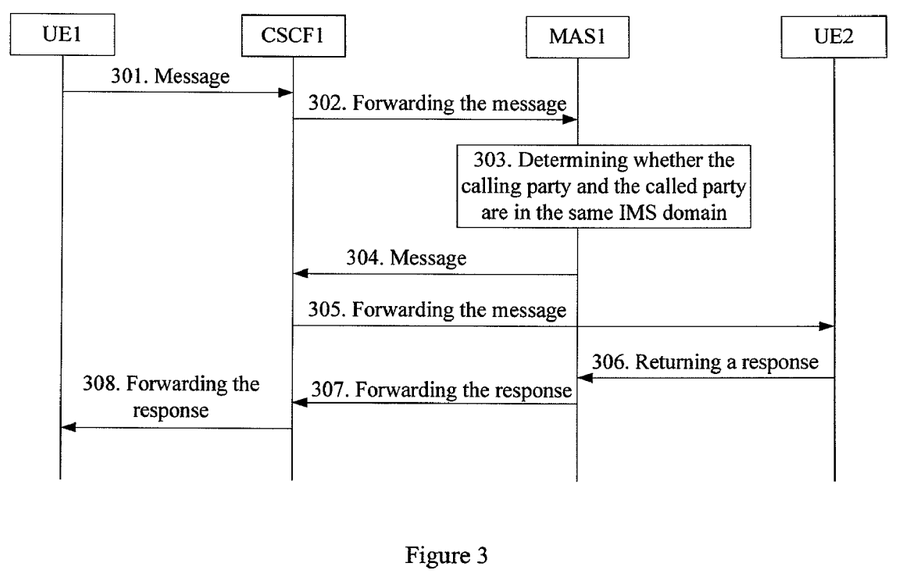
FIG. 3 is a signaling flowchart of the method for implementing IMS messaging services in an embodiment of the present disclosure.

When the calling user and the called user are in the same IMS domain, MAS 1 may send information to UE 2 directly according to the called user registration information stored locally. A non session-based message transmission process in the instant messaging service is detailed below as an example. FIG. 3 is a signaling flowchart of the method for implementing IMS messaging services in an embodiment of the present disclosure. The method includes the following steps:

Step 301: UE 1 sends a "MESSAGE" message to CSCF 1.

The "MESSAGE" message based on Session Initiation Protocol (SIP) is used to implement the instant message mechanism and carries the addresses of the calling user and the called user and corresponding description of the message content in the message header field. A common format of an address is "im: user@domain". The instant message content is carried in the request message body. The content in the message body may be a text or a multimedia clip such as sound and images. The sending and receiving of each instant message are a separate process and have no necessary context relation with the processing of other messages.

Step 302: CSCF 1 forwards the "MESSAGE" message to MAS 1.

CSCF 1 triggers the message to MAS 1 according to the service triggering principles.

Step 303: MAS 1 determines whether the calling user and the called user are in the same IMS domain according to user registration information and performs step 304 if the calling user and the called user are in the same IMS domain.

Each MAS stores the registration information of users in this IMS domain. MAS 1 searches for the stored registration information of users in this IMS domain. If the registration information of the called user is found, the calling user and the called user are in the same IMS domain.

If the calling user and the called user are not in the same IMS domain, for example, belong to different service providers, MAS 1 is unable to find out the registration information of the called user. In this case, the message is forwarded to UE 2 through CSCF 2 and MAS 2 according to the conventional technology, which is not described further.

Steps 304 to 305: MAS 1 forwards the "MESSAGE" message to UE 2 through CSCF 1.

The message sent from MAS 1 to CSCF 1 carries the information about whether the calling user and the called user are in the same domain, and CSCF 1 makes a judgment according to such information. If the calling user and the called user are in the same IMS domain, CSCF 1 routes the "MESSAGE" message to UE 2 directly. If the calling user and the called user are not in the same IMS domain, CSCF 1 first routes the "MESSAGE" message to the IMS domain of the called user, that is, forwards the "MESSAGE" message to MAS 2 through CSCF 2 in the terminating network and then MAS 2 sends the "MESSAGE" message to UE 2 through CSCF 2, which is the same as the process in the conventional technology.

Steps 306 to 308: After receiving the "MESSAGE" message, UE 2 returns a 200 OK response to UE 1 through MAS 1 and CSCF 1.

If UE 1 receives a 200 OK response, the message is sent successfully.

Therefore, the present disclosure differs from the conventional technology in that when MAS 1 determines that the calling user and the called user are in the same IMS domain through the stored user registration information, the message is sent to UE 2 directly rather than being sent through CSCF 2 and MAS 2 in the terminating network, thus avoiding repeated forwarding of the message and shortening the interaction process and message transmission time.

An instant message may also be a session-based message, and the connection may be created through an INVITE request. The instant message is different from an ordinary "MESSAGE" message in that: before the message is forwarded to the called user through the originating network, UE 1 needs to send an INVITE request which is forwarded to MAS 1 through CSCF 1 in the originating network. After receiving the INVITE request, MAS 1 determines whether the calling user and the called user are in the same IMS domain according to the user registration information. If so, MAS 1 sends an INVITE request which is forwarded to UE2 through CSCF 1. After UE 2 returns a 200 OK response to UE 1 along the route of the INVITE request, UE 1 forwards the message body to MAS 1 through CSCF 1 by means of the INVITE request and the connection created by UE 2. MAS 1 sends the message body to UE 2 through CSCF 1, thus avoiding the forwarding by CSCF 2 and MAS 2 and shortening the interaction process and the message body transmission time.

Figure 4:
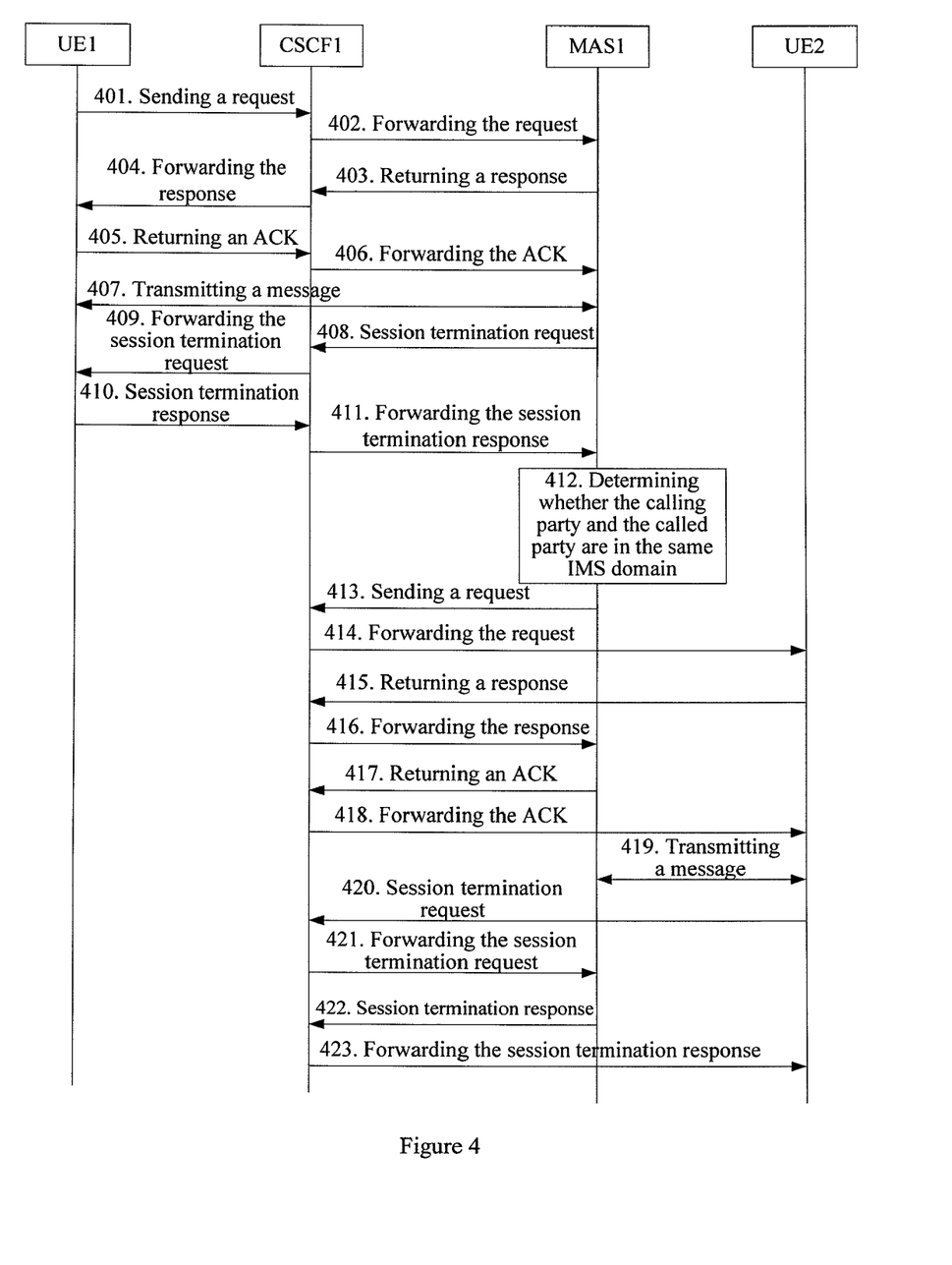
FIG. 4 is another signaling flowchart of the method for implementing IMS messaging services in an embodiment of the present disclosure.

The implementation process of the store-and-forward messaging service is a little different from the transmission process of the instant messaging service in that: after MAS 1 receives a message body, the message body is stored temporarily and then sent to UE 2 rather than being sent out directly. In order to help those skilled in the art better understand the present disclosure, the process of session-based messaging in the store-and-forward messaging service when the calling user and the called user are in the same IMS domain is detailed below. FIG. 4 is a signaling flowchart of the method for implementing IMS messaging services in an embodiment of the present disclosure. The method includes the following steps:

Steps 401 to 402: UE 1 sends an INVITE request to CSCF1, then the INVITE request is forwarded to MAS 1 through CSCF 1.

UE 1 sends an INVITE request, which provides enough information for the called user to join the session, including the type of the message body, the format of the message body, the address of the called user, and the port number of the called user. For example, the information indicates whether the message body is a text, audio, or video and specifies the corresponding format. The INVITE request is sent to CSCF 1, and CSCF 1 triggers the request to MAS 1 according to the service triggering principles.

Steps 403 to 404: After receiving the INVITE request, MAS 1 returns a 200 OK response which is forwarded to UE 1 through CSCF 1.

MAS 1 receives the request, and returns a 200 OK response to UE 1 through CSCF 1.

Steps 405 to 406: After receiving the 200 OK response, UE 1 returns an ACK message which is forwarded to MAS 1 through CSCF 1.

A route field is added to the INVITE request message sent by the CSCF1 so the ACK message is sent to MAS 1 along the route of the INVITE request.

Through steps 401 to 406, a connection is created between UE 1 and MAS 1, and UE 1 may transmit the message body to MAS 1 directly through the connection.

Step 407: Through the connection created in steps 401-406, UE 1 transfers the message body to MAS 1.

Steps 408 to 409: MAS 1 sends a session termination request "BYE" which is forwarded to UE 1 through CSCF 1.

Steps 410 to 411: UE 1 returns a session termination response which is forwarded to MAS 1 through CSCF 1.

The session termination request may also be sent by UE 1. When either user wants to terminate the session, a BYE request is sent to the opposite user directly, and the opposite user returns a 200 OK response, thus terminating the session between both parties.

Step 412: MAS 1 determines whether the calling user and the called user are in the same IMS domain and performs step 413 if the calling user and the called user are in the same IMS domain.

MAS 1 stores only the registration information of users in the originating network. MAS 1 may make a judgment according to the locally stored user registration information. If the registration information of the called user can be found, the calling user and the called user are in the same IMS network, namely, in the same IMS domain.

If the calling user and the called user are not in the same IMS domain, the message body transmission process in the conventional technology applies, as detailed in steps 213-238 in FIG. 2.

Steps 413 to 414: MAS 1 sends an INVITE request to CSCF 1, then the INVITE request is forwarded to UE 2.

The INVITE request sent from MAS 1 to CSCF 1 carries the information about whether the calling user and the called user are in the same domain, and CSCF 1 makes a judgment according to such information. If the calling user and the called user are in the same IMS domain, CSCF 1 forwards the INVITE request to UE 2 directly. If the calling user and the called user are not in the same IMS domain, CSCF 1 forwards the INVITE request to the IMS domain of the called user first, that is, forwards the request to MAS 2 through CSCF 2 in the terminating network, and then MAS 2 sends the INVITE request to UE 2 through CSCF 2, which is the same as the process in the conventional technology.

Steps 415 to 416: After receiving the INVITE request, UE 2 returns a 200 OK response which is forwarded to MAS 1 through CSCF 1.

Steps 417 to 418: MAS 1 returns an ACK message which is forwarded to UE 2 through CSCF 1.

Steps 413 to 418 are similar to steps 401-406, where a new connection is created by sending a session request, which is not described further.

Step 419: Through the connection created in steps 413 to 418, MAS 1 transfers the message body to UE 2.

Steps 420 to 421: UE 2 sends a session termination request "BYE" which is forwarded to MAS 1 through CSCF 1.

Steps 422 to 423: MAS 1 returns a session termination response "200 OK" which is forwarded to UE 2 through CSCF 1.

The foregoing embodiment shows that: when the calling user and the called user are in the same IMS domain, it is not necessary for MAS 1 and MAS 2 to negotiate and create a new session connection. The message body is not necessarily forwarded through MAS 2 or CSCF 2 in the terminating network, thus shortening the information interaction process and the message body transmission time massively. Especially, when the message body is huge, it takes a long time to transmit the message, and cutback of one forwarding operation of the message means much reduction of the message body transmission time.

A typical message in the session-based messaging service is a Message Session Relay Protocol (MSRP) message. MSRP is a text-based protocol characterized by its running over the protocol that supports congestion control, for example, the Transmission Control Protocol (TCP), Simple Control Transmission Protocol (SCTP), and Transport Layer Security (TLS) over TCP. Therefore, the MSRP does not limit the size of a message body. Another characteristic of MSRP is that it works in the media layer so that it does not traverse SIP agent servers such as CSCF. In this way, the SIP agent server is free from plenty of instant messages. Therefore, the message body of an MSRP message is generally large and requires a long transmission time. When the calling user and the called user are in the same IMS domain, the MSRP message does not need to be forwarded by MAS 2 again, thus saving much time of transmitting the message.

The non session-based message in the store-and-forward messaging service (for example, a "MESSAGE" message) differs from the message in the instant messaging service in that: after MAS 1 receives a "MESSAGE" message sent by UE 1 through CSCF 1, MAS 1 returns a 200 OK response to UE 1 through CSCF 1 indicating that the message has been sent successfully. Subsequently, MAS 1 determines whether the calling user and the called user are in the same IMS domain according to the user registration information. If the calling user and the called user are in the same IMS domain, MAS 1 sends a "MESSAGE" message which is forwarded to UE 2 through CSCF 1. After the message is sent successfully, UE 2 returns a 200 OK response to MAS 1 through CSCF 1. It is thus evident that when the calling user and the called user are in the same IMS domain, the "MESSAGE" message does not need to be forwarded by MAS 2 or CSCF 2 in the terminating network, thus shortening the information interaction process and the message body transmission time massively.

The above is a scenario where the calling user and the called user are in the same IMS domain. The following describes a process of implementing IMS messaging services when the calling user and the called user are not in the same IMS domain in an embodiment of the present disclosure.

In a scenario where the calling user and the called user are not in the same IMS domain, a long transmission time is still required when a large message such as a MSRP message, which generally carries a large text, audio, or video MSRP message, is transmitted to the terminating network from the originating network according to the conventional technology if the originating network and the terminating network store the message body on the same physical node (for example, if the originating network and the terminating network store the message on the MAS), where MAS 1 and MAS 2 are different logical nodes but essentially the same physical node, or, if the originating network and the terminating network share an MSRP server for storing MSRP messages. The detailed message transmission process when the calling user and the called user are not in the same IMS domain but the originating network and the terminating network store the message body on the same physical node is described below with reference to accompanying drawings, where the process of UE 1 transmitting the message body to MAS 1 is the same as steps 401-411 in FIG. 4. The process of MAS 2 transmitting the message body to UE 2 is the same as steps 228-238 in the conventional technology, and the two processes are not described further. Only the process after MAS 1 receives the message body and before MAS 2 needs to send the message body to UE 2 is detailed below.

Figure 5:
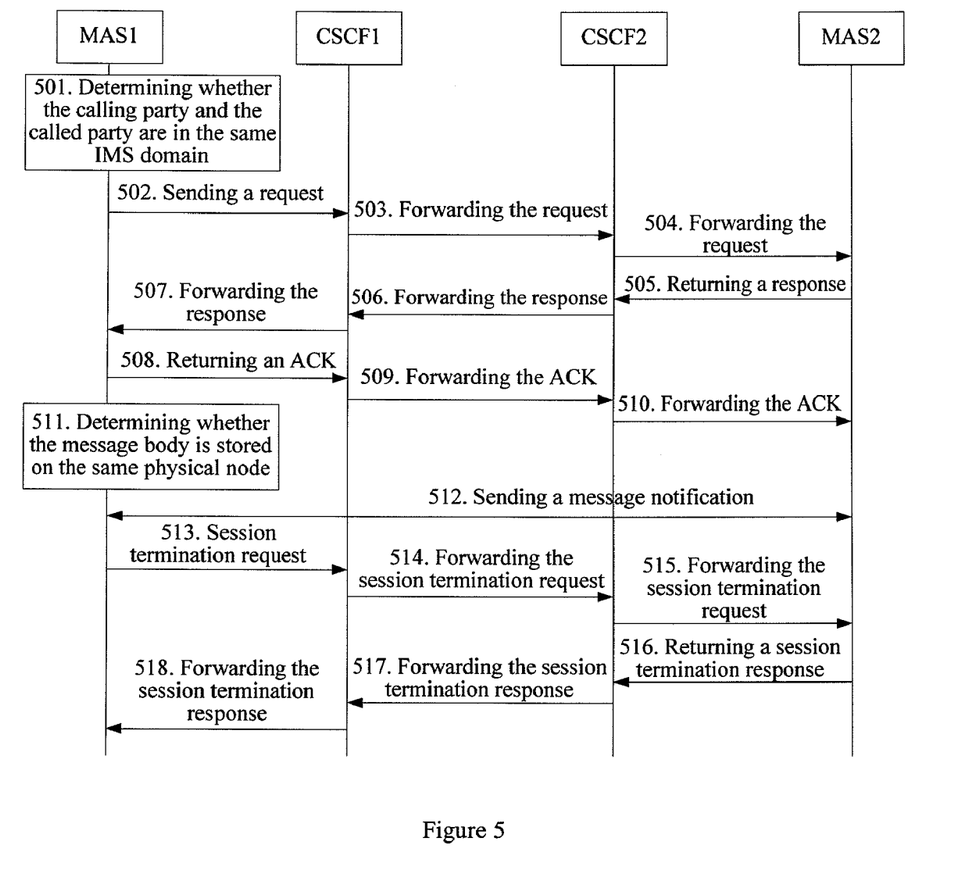
FIG. 5 is part of a signaling flowchart of the method for implementing IMS messaging services in an embodiment of the present disclosure.

FIG. 5 is part of the signaling flowchart of the method for implementing IMS messaging services in an embodiment of the present disclosure. The method includes the following steps:

Step 501: MAS 1 determines whether the calling user and the called user are in the same IMS domain and performs step 502 if the calling user and the called user are not in the same IMS domain.

Steps 502 to 504: MAS 1 sends an INVITE request which is forwarded to MAS 2 through CSCF 1 and CSCF 2.

Steps 505 to 507: MAS 2 returns a 200 OK response which is forwarded to MAS 1 through CSCF 2 and CSCF 1.

Steps 508 to 510: MAS 1 returns an ACK message which is forwarded to MAS 2 through CSCF 1 and CSCF 2.

Step 511: MAS 1 determines whether the originating network and the terminating network store the message body on the same physical node. If the originating network and the terminating network store the message body on the same physical node, MAS 1 performs step 512.

MAS 1 may make a judgment through the IP address or physical address of the node which stores the message body in the terminating network (the address is carried in the message) or set a special flag to identify whether the originating network and the terminating network store the message body on the same physical node. For example, if the MAS of the calling user and the MAS of the called user are the same physical node where the MSRP message is stored, MAS 1 may make a judgment according to the MAS 2 IP address carried in the message. If the IP address of MAS 2 is the same as the IP address of MAS 1, the originating network and the terminating network share a MAS and the MSRP message is stored on this MAS.

Step 512: Through the connection created in steps 502 to 510, MAS 1 sends a message notification to MAS 2.

In this step, MAS 1 does not need to send a specific MSRP message body to MAS 2 but sends only a message notification to MAS 2 indicating the physical address for storing the message body or indicating that the message body has been sent although the message body has actually not been sent. A message notification is very small and requires little transmission time so the transmission time of the message body is reduced.

Steps 513 to 515: MAS 1 sends a session termination request "BYE" which is forwarded to MAS 2 through CSCF 1 and CSCF 2.

When MAS 2 needs to send the message body to UE 2, MAS 2 sends an INVITE request which is forwarded to UE 2 through CSCF 2. After MAS 2 returns an ACK response, the connection is created and MAS 2 transmits the message body to UE 2, which is the same as steps 228-238 in the conventional technology, and not described further.

Steps 516 to 518: MAS 2 returns a session termination response "200 OK" which is forwarded to MAS 1 through CSCF 2 and CSCF 1.

The above is a process of implementing messaging services when the calling user and the called user are not in the same IMS domain but the originating network and the terminating network store the message body on the same physical node.

For MSRP messaging services, it is possible that the calling user and the called user are in the same domain, and the originating network and the terminating network store the message body on the same physical node such as MAS. When MAS 1 receives an MSRP message from UE 1, it is determined that the called user is also in the originating network, that is, the calling user and the called user are in the same MAS domain, and the originating network and the terminating network own the same MAS. Hence, the message body can be sent to the called user directly. If the originating network and the terminating network store the message body on the same physical node, even if MAS 2 sends the message body to UE 2, it is MAS 1 that sends the message body to UE 2 because the originating network and the terminating network own the same MAS. Therefore, when the calling user and the called user are in the same domain, and the originating network and the terminating network store the message body on the same physical node, the message transmission process is the same as the transmission process when the calling user and the called user are in the same domain but the originating network and the terminating network store the message body on the same physical node. Therefore, when MAS 1 determines that the calling user and the called user are in the same IMS domain, it is not necessary to determine whether the originating network and the terminating network store the message body on the same physical node, thus shortening the processing process and the message body transmission time.

The foregoing embodiments describe the method for implementing messaging services. A MAS provided in an embodiment of the present disclosure is described below.

Figure 6:
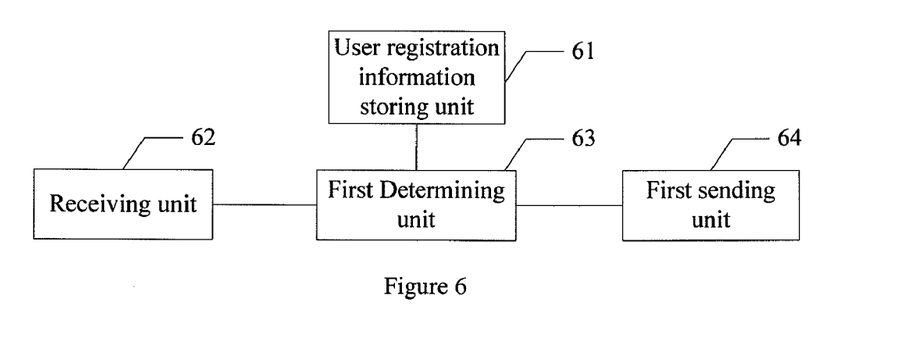
FIG. 6 shows a structure of a MAS in an embodiment of the present disclosure.

FIG. 6 shows an exemplary structure figure of a MAS in an embodiment of the present disclosure. The MAS includes a user registration information storing unit 61 adapted to store user registration information, a receiving unit 62 adapted to receive a message body sent by a calling user, a first determining unit 63 adapted to determine whether the calling user and the called user are in the same IMS domain according to the user registration information stored in the user registration information storing unit 61 when the receiving unit 62 receives the message body from the calling user and a first sending unit 64 adapted to send the message body received by the receiving unit 62 from the calling user to the called user when the first determining unit 63 determines that the calling user and the called user are in the same IMS domain.

Instead of forwarding all message bodies received from the calling user to the terminating network of the called user uniformly, the MAS determines whether the calling user and the called user are in the same IMS domain before sending a message body. If the calling user and the called user are in the same IMS domain, the originating network may perform information interaction with the called user directly. Therefore, the message body may be sent to the called user directly through the originating network where the calling user is located. With this MAS, when the calling user and the called user are in the same IMS domain, one forwarding operation of the message body is avoided, thus shortening the information interaction process and the message body transmission time massively.

If the MAS is adapted to handle the store-and-forward messaging service, for example, the transmitted message body is carried in an MSRP message, the MAS described in this embodiment may be further improved, which is detailed in another embodiment below.

Figure 7:
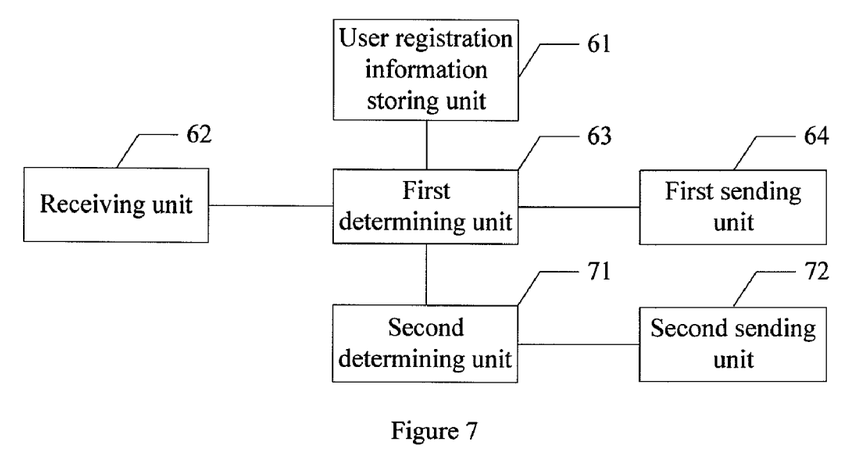
FIG. 7 shows another structure of a MAS in an embodiment of the present disclosure.

FIG. 7 shows a structure of a MAS in an embodiment of the present disclosure. Unlike the embodiment shown in FIG. 6, this MAS includes a second determining unit 71 and a second sending unit 72, where the second determining unit 71 is adapted to determine whether the originating network and the terminating network store the message body on the same physical node after the first determining unit 63 determines that the calling user and the called user are not in the same IMS domain, and the second sending unit 72 is adapted to notify the terminating network that the message body has been sent after the second determining unit 72 determines that the originating network and the terminating network store the message body on the same physical node.

When the calling user and the called user are not in the same IMS domain but the originating network and the terminating network store the message body on the same physical node, the MAS sends a message notification instead of the message body to the terminating network. A message notification is small and requires only a very short transmission time while a message body is large, requires a long transmission time and wastes bandwidth resources. Therefore, this MAS may shorten the message interaction and processing process, and reduce the message body transmission time.

Figure 8:
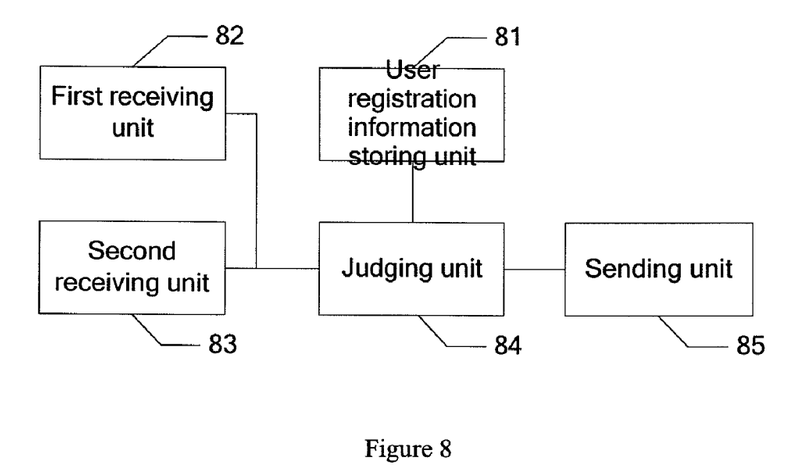
FIG. 8 shows another structure of a MAS in an embodiment of the present disclosure.

Another MAS provided in an embodiment of the present disclosure is adapted to receive session-based messages in the instant messaging service. FIG. 8 shows a structure of a MAS provided in this embodiment. The MAS includes a user registration information storing unit 81 adapted to store user registration information, a first receiving unit 82 adapted to receive a session connection creation request sent by a calling user, a second receiving unit 83 adapted to receive a message body sent by the calling user, a determining unit 84 adapted to determine whether the calling user and the called user are in the same IMS domain according to the user registration information stored in the user registration information storing unit 81 when the first receiving unit 82 receives the session connection creation request from the calling user, and a sending unit 85 adapted to send a session connection creation request to the called user, and send the message body received by the second receiving unit 83 from the calling user to the called user through the created connection when the determining unit 84 determines that the calling user and the called user are in the same IMS domain.

Unlike the embodiment shown in FIG. 6, this MAS determines whether the calling user and the called user are in the same IMS domain immediately after receiving the session connection creation request from the user rather than after receiving the message body. Nevertheless, when the calling user and the called user are in the same IMS domain, the MAS in this embodiment does not need to send the message body to the terminating network where the called user is located or subsequently forward the message body, which is the same as the embodiment shown in FIG. 6. Therefore, when the calling user and the called user are in the same IMS domain, the MAS can also shorten the information interaction process and the message body transmission time.

In conclusion, the embodiments of the present disclosure provide the following benefits.

After the originating MAS determines that the calling user and the called user are in the same IMS domain, the message body is sent to the called user directly through information interaction with the called user rather than being sent to the terminating network and then forwarded, thus shortening the interaction process and the message body transmission time.

For store-and-forward messaging services, when the originating network and the terminating network store the message body on the same physical node, the originating network sends a notification instead of the message body to the terminating network, thus reducing the transmission time, especially when the message body is large.

A method for implementing messaging services and a MAS have been described above in embodiments of the present disclosure. Although the disclosure has been described through some exemplary embodiments, the disclosure is not limited to such embodiments. It is apparent that those skilled in the art can make various modifications and variations to the disclosure without departing from the spirit and scope of the disclosure.

What is claimed is:

1. A method for implementing IP Multimedia Subsystem (IMS) messaging services, comprising:
   receiving, by an originating Call Session Control Function (CSCF1), a message body sent by a calling user;
   forwarding, by the originating CSCF (CSCF1), the message body to an originating Message Application Server (MAS1);
   determining, by the originating MAS (MAS1), whether the calling user and a called user belong to a same IMS domain according to user registration information, wherein the calling user is a registered user of an IMS domain and the called user is a registered user of an IMS domain; and
   sending, by the originating MAS (MAS1), the message body to the called user through the originating CSCF (CSCF1) and bypassing a terminating MAS (MAS2) and a terminating CSCF (CSCF2), if the calling user and the called user are in the same IMS domain.

2. The method of claim 1, wherein the message body is carried in a "MESSAGE" message.

3. The method of claim 1, wherein the process of receiving the message body sent by the calling user comprises:
   receiving a session connection creation request sent by the calling user, and receiving the message body sent by the calling user through a connection created by means of the session connection creation request; and
   the process of sending the message body to the called user includes:
   sending the session connection creation request to the called user, and sending the message body to the called user through the connection created by means of the session connection creation request.

4. The method of claim 3, further comprising:
   determining whether an originating network and a terminating network store the message body on a same physical node when the calling user and the called user are not in the same IMS domain; and
   sending, when the originating network and the terminating network store the message body on the same physical node, a message notification of a physical address for storing the message body to a Message Application Server (MAS) of the terminating network; or notifying the terminating network that the message body has been sent.

5. A method for implementing IP Multimedia Subsystem (IMS) messaging services, comprising:
   receiving, by an originating Call Session Control Function (CSCF1), a session connection creation request sent by a calling user;
   forwarding, by the originating CSCF (CSCF1), the session connection creation request to an originating Message Application Server (MAS1) in order to create a connection between the calling user and the original MAS (MAS1);
   determining, by the original MAS (MAS1), whether the calling user and a called user belong to a same IMS domain according to user registration information, wherein the calling user is a registered user of an IMS domain and the called user is a registered user of an IMS domain;
   forwarding, by the original MAS (MAS1), the session connection creation request to the called user through the original CSCF (CSCF1) and bypassing a terminating MAS and a terminating CSCF, in order to create a connection between the called user and the original MAS (MAS1), if the calling user and the called user are in the same IMS domain; and
   receiving a message body sent by the calling user through the connection between the calling user and the original MAS (MAS1), and forwarding the message body to the called user through the connection between the called user and the original MAS (MAS1).

6. A Message Application Server (MAS), comprising:
a user registration information storing unit, adapted to store user registration information;
a receiving unit, adapted to receive a message body sent by a calling user;
a first determining unit, adapted to determine whether the calling user and a called user are in a same IP Multimedia Subsystem (IMS) domain according to the user registration information stored in the user registration information storing unit, wherein the calling user is a registered user of an IMS domain and the called user is a registered user of an IMS domain; and
a first sending unit, adapted to send the message body received by the receiving unit from the calling user to the called user bypassing a terminating MAS and a terminating Call Session Control Function (CSCF) when the first determining unit determines that the calling user and the called user are in the same IMS domain.

7. The MAS of claim 6, further comprising:
a second determining unit, adapted to determine whether an originating network and a terminating network store the message body on a same physical node after the first determining unit determines that the calling user and the called user are not in the same IMS domain; and
a second sending unit, adapted to send a message notification of a physical address for storing the message body to the MAS of the terminating network or notify the terminating network that the message body has been sent after the second determining unit determines that the originating network and the terminating network store the message body on the same physical node.

8. A Message Application Server (MAS), comprising:
a user registration information storing unit, adapted to store user registration information;
a first receiving unit, adapted to receive a session connection creation request sent by a calling user in order to create a connection between the calling user and the MAS (MAS1);
a second receiving unit, adapted to receive a message body sent by the calling user through the connection between the calling user and the MAS (MAS1);
a determining unit, adapted to determine whether the calling user and a called user are in the same IMS domain according to the user registration information stored in the user registration information storing unit when the first receiving unit receives the session connection creation request from the calling user, wherein the calling user is a registered user of an IMS domain and the called user is a registered user of an IMS domain; and
a sending unit, adapted to forward the session connection creation request to the called user bypassing a terminating MAS and a terminating Call Session Control Function (CSCF), in order to create a connection between the called user and the MAS (MAS1), when the determining unit determines that the calling user and the called user are in the same IMS domain, and forward the message body to the called user through the connection between the called user and the MAS (MAS1).

\* \* \* \* \*